United States Patent [19]
Thuecks et al.

[11] Patent Number: 5,326,248
[45] Date of Patent: Jul. 5, 1994

[54] PRODUCT SERVING APPARATUS

[75] Inventors: Steven J. Thuecks, Brillion; William I. Kessler, Sheboygan; Alan J. Schommer, Fredonia, all of Wis.

[73] Assignee: The Vollrath Company, Inc., Sheboygan, Wis.

[21] Appl. No.: 7,626

[22] Filed: Jan. 21, 1993

[51] Int. Cl.⁵ ............................................. A23G 9/00
[52] U.S. Cl. .................................. 425/187; 425/276; 425/285
[58] Field of Search ............... 425/276, 277, 278, 279, 425/280, 281, 282-286, 187

[56] References Cited

U.S. PATENT DOCUMENTS

| | | | |
|---|---|---|---|
| 961,429 | 6/1910 | Clark | 425/284 |
| 1,109,578 | 6/1911 | Gilchrist | 425/285 |
| 1,728,505 | 9/1929 | Palmer | 425/285 |
| 1,789,065 | 1/1931 | Brezin | 425/285 |
| 1,826,818 | 10/1931 | Palmer | 425/285 |
| 1,903,791 | 4/1933 | Myers | 425/187 |
| 2,041,200 | 5/1936 | Myers | 425/285 |
| 2,427,095 | 9/1947 | Gordon et al. | 425/285 |
| 2,448,863 | 9/1948 | Costa | 425/285 |
| 2,498,331 | 2/1950 | Bloomfield | 425/285 |
| 4,758,150 | 7/1988 | Fanini et al. | 425/285 |
| 4,859,168 | 8/1989 | Calder | 425/284 |

OTHER PUBLICATIONS

Hamilton Beach/Proctor Silex, Inc. brochure, Sep. 1991, one page, 4421 Waterfront Dr., Glen Allen, Va. 23060, printed in USA.

Crest Mfg. Inc. 1992 catalog, 1992, p. 32, 520 N. Redwood Rd., P.O. Box 540219, N. Salt Lake, Ut. 84054-0210.

The Zeroll Co., 1991, one page, P.O. Box 999, Ft. Pierce, Fla. 34954, printed in USA.

Primary Examiner—Khanh Nguyen
Attorney, Agent, or Firm—Foley & Lardner

[57] ABSTRACT

A product serving apparatus includes an apportioning scoop, a product separation assembly for separating the product from the scoop, a hand operated actuator assembly for driving the product separation assembly, and an integral handle and support assembly affixed to the scoop. The handle assembly provides a substantially smooth exterior which is impermeable to soil or food product. The handle assembly provides a crevice-free exterior extending over the entire distance between its ends.

36 Claims, 6 Drawing Sheets

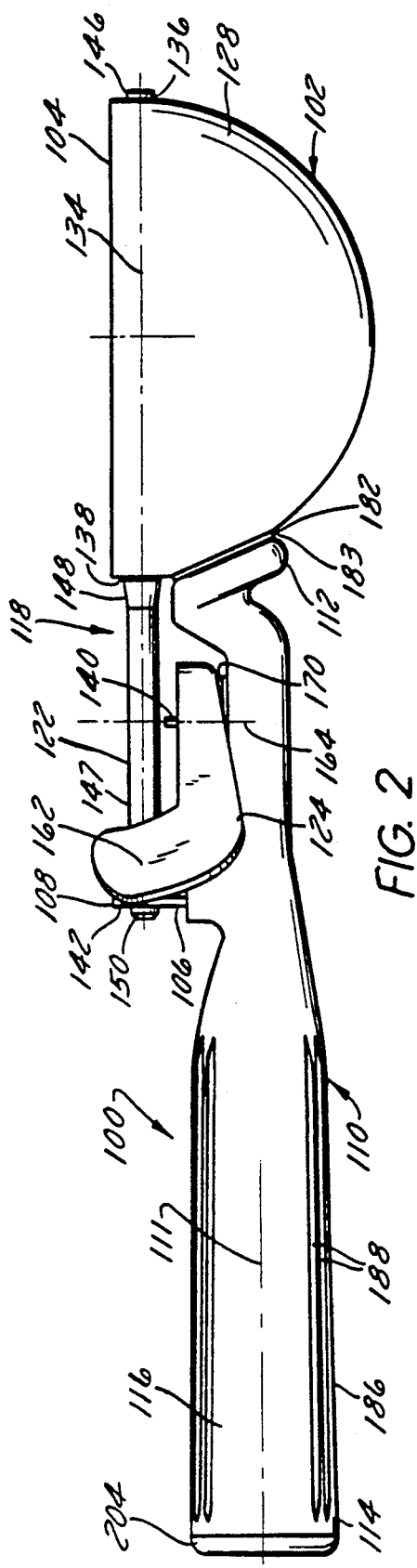
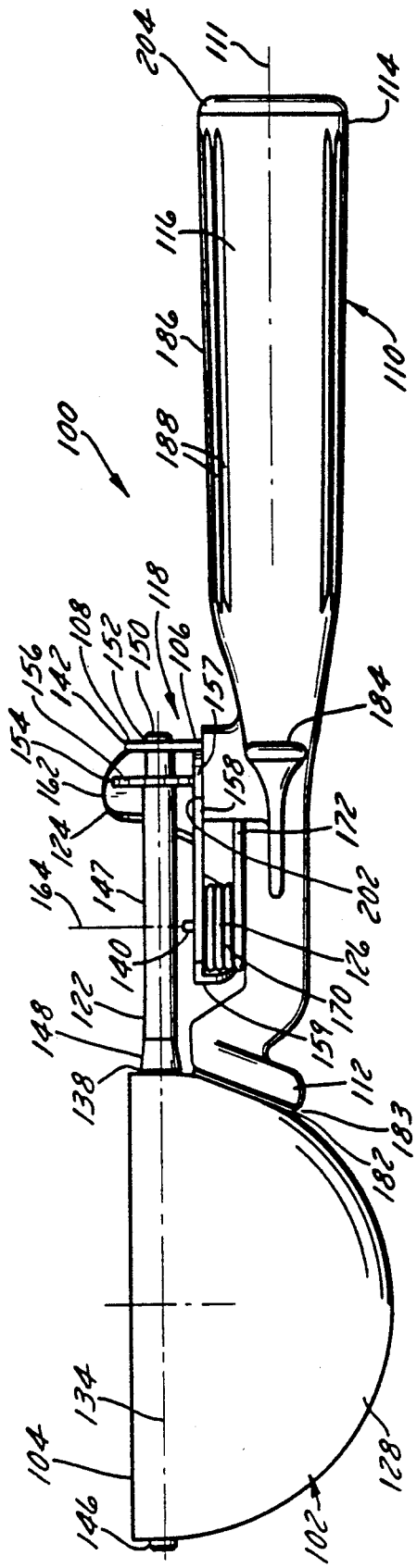

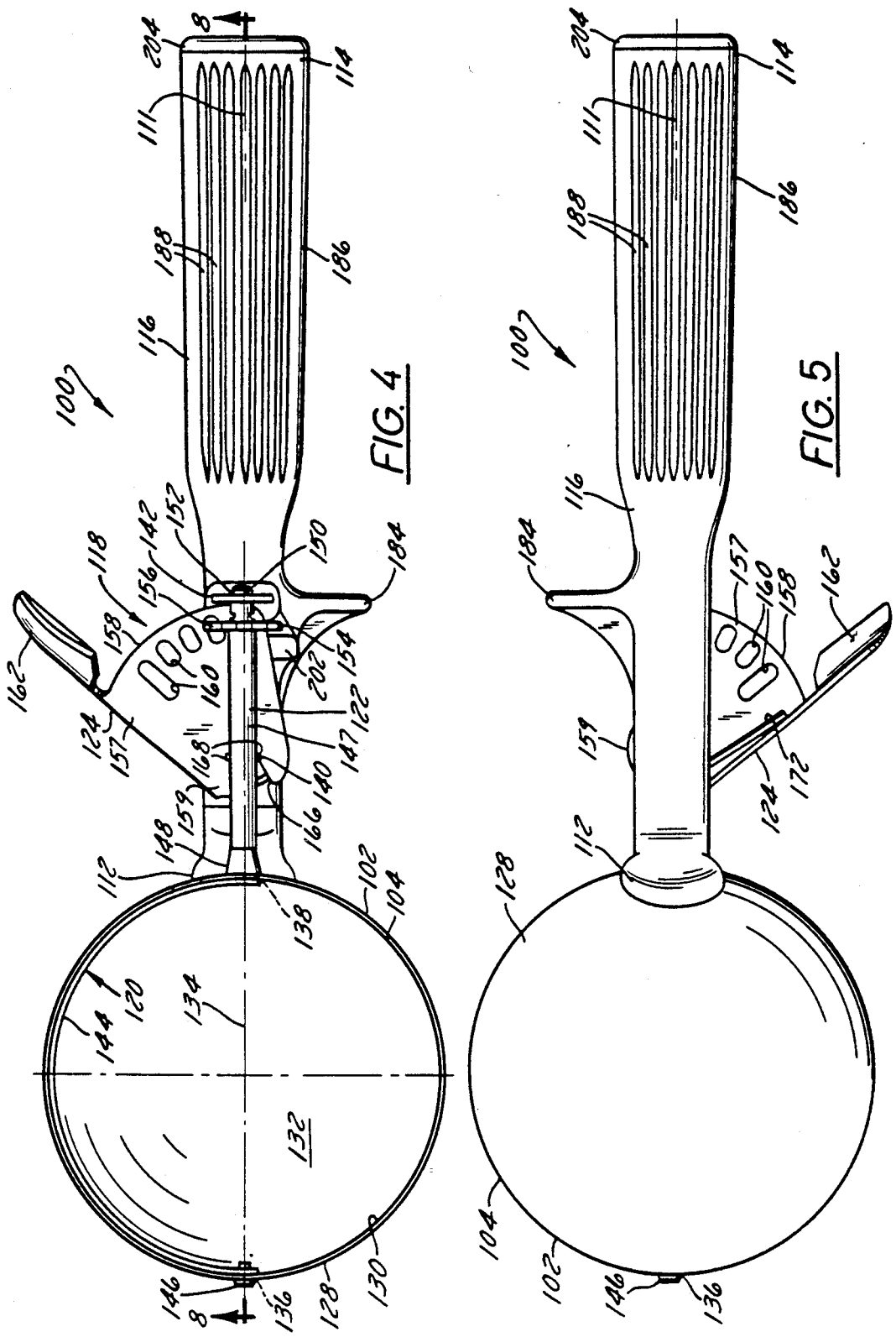

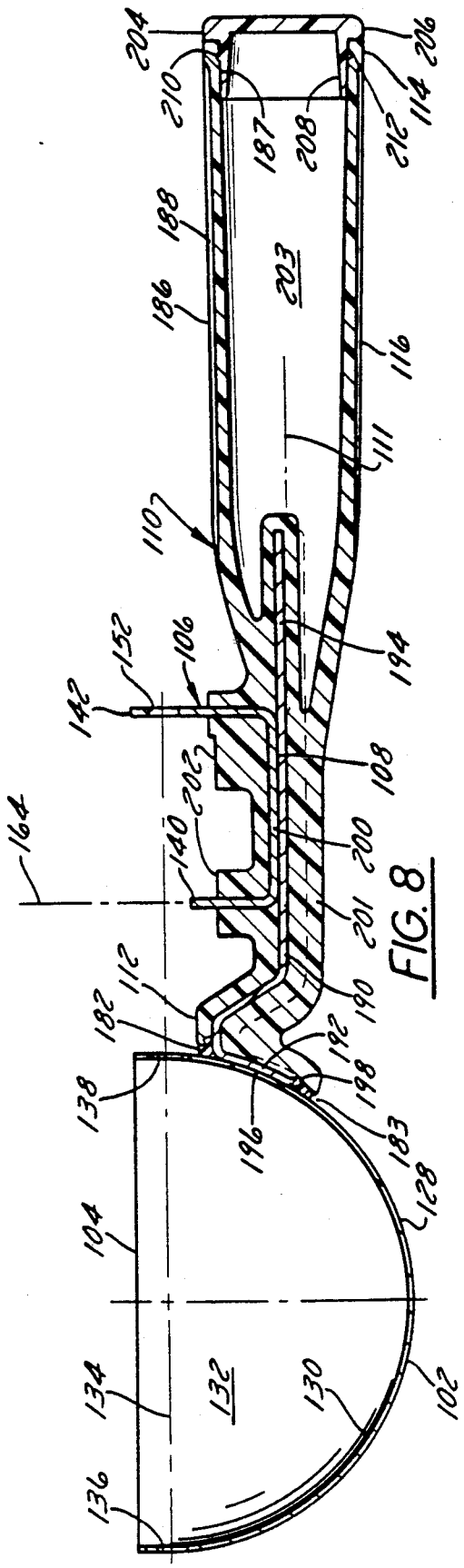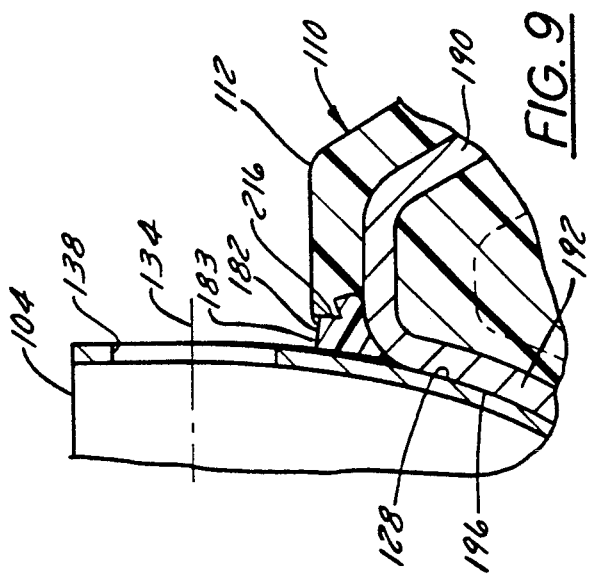

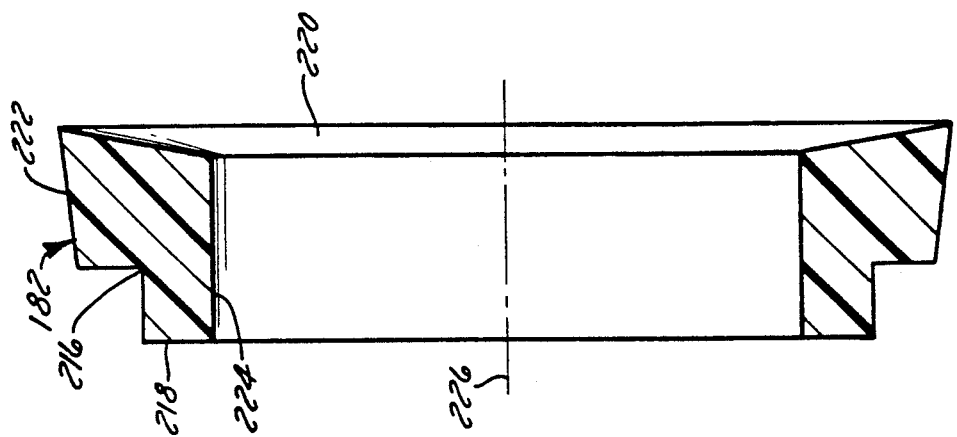
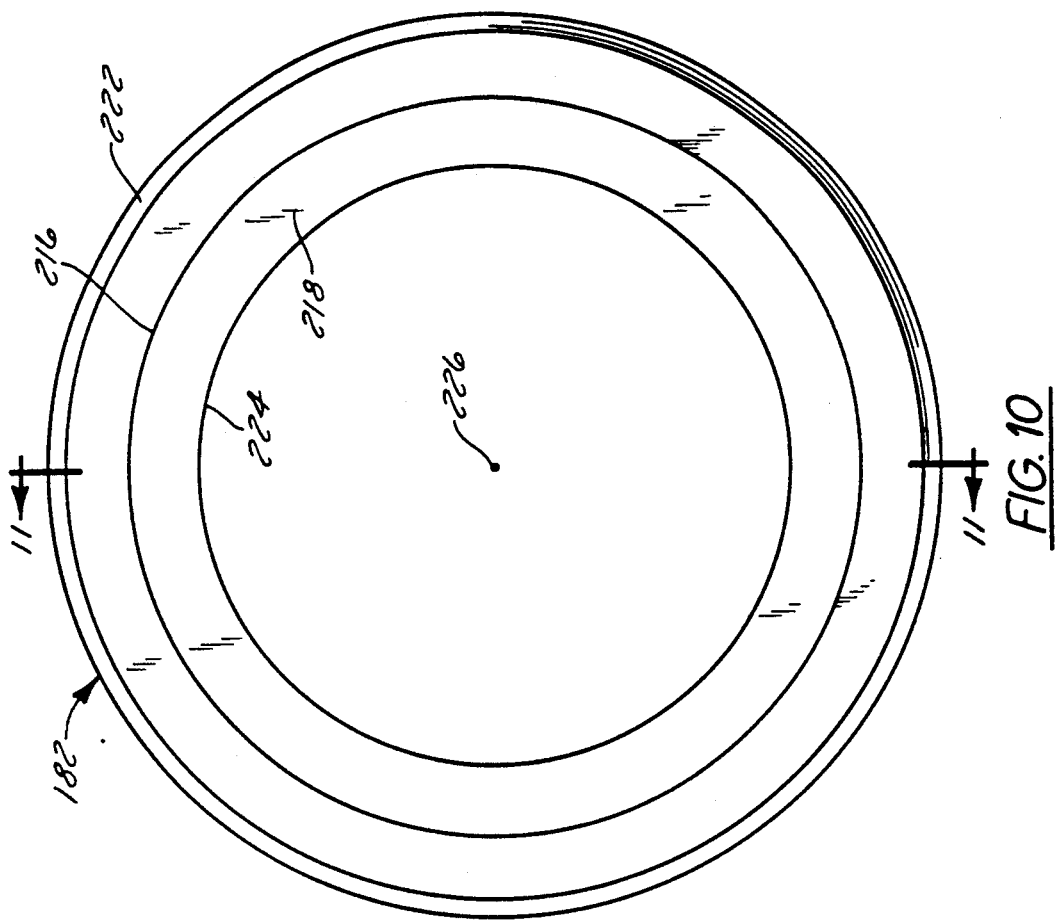

, 326,248

PRODUCT SERVING APPARATUS

TECHNICAL FIELD

This invention relates to an apparatus for serving predetermined portions of a product, and particularly to an apparatus including a scoop through which a product separator is pivoted to separate the product from the scoop; the apparatus includes a handle which presents a smooth exterior that resists collection of the product or other soil.

BACKGROUND OF THE INVENTION

Scoop devices, commonly known as dishers, are used for serving predetermined portions of a product. Dishers are well known in the prior art and are often used in food service environments where the server wishes to serve consistent predetermined portions of a food product. For instance, employees in a cafeteria may use dishers to serve consistent helpings of a food such as mashed potatoes.

A typical prior art disher includes a bowl or scoop affixed to a mounting boss. A stem is generally affixed to this boss and includes a threaded end located distally from the scoop onto which a handle is attached. A thin, metal sweep is pivotally mounted in the bowl and attached to a shaft which is rotated by a spring loaded thumb rack moved transversely to the handle. The rotating shaft is typically supported by a metal tab depending from the stem and having an aperture through which an end of the shaft extends. This tab is often captively held between the handle and a flange on the stem when the handle is turned onto the threaded end. The thumb rack is pivotally mounted on a pin which is affixed to the stem. All of the various inter-part attachment points of prior art dishers establish crevices and gaps in which the product being served or other matter collects. This collected product is difficult to wash away and usually remains trapped from one use to the next. If the product is a food product, bacteria and other microorganisms propagate throughout the crevices and gaps making the disher unsanitary for future use.

Dishers are commonly used in the commercial food service industry so that they are often used daily in the service of food. This fact makes it all the more important that dishers be substantially free from the cracks and crevices in which food or soil can collect and microorganisms can develop. The NSF International (NSF) has established guidelines to which dishers must adhere before they are stamped as NSF Certified.

NSF is concerned that there be a minimum of food or soil collection points, particularly in the areas closest to the bowl considered the food zone area. Some manufacturers of prior art dishers fill the cracks and crevices present in inter-part joint areas with epoxy or other types of fillers to eliminate soil collection points in order to gain NSF approval. However, some fillers, such as epoxies, are brittle and break off or begin to flake away as the disher is repeatedly used. Thus, although the disher may have obtained NSF approval when manufactured, unsanitary conditions may develop over time.

It would be advantageous to have a serving device in which many of these unsanitary product collection points were eliminated. In particular, it would be advantageous to eliminate not only the collection points close to the bowl but also the collection From a manufacturer's viewpoint, NSF certification is important not only for sanitary reasons but also for marketing reasons. Many commercial buyers require that the dishers they purchase meet or exceed the NSF standards. Consequently, the NSF standards play an important role in the design of dishers making it extremely desirable to minimize unsanitary collection points.

NSF standards also require that the various components of a disher be removable for cleaning without requiring the use of tools. Typically, in disassembling prior art dishers, the handle is unscrewed from the stem allowing the tab which supports the shaft to be removed. The sweep can then be snapped loose from the bowl and removed as a unit with the shaft. After the shaft is removed, the thumb rack and spring are easily removed. Over time, this prior art arrangement can present problems since the tab supporting the shaft is not affixed to the stem. When the disher is reassembled the aperture in the tab is not always properly aligned. This can, in turn, misalign the shaft with respect to the bowl leading to binding, difficulty in movement of the thumb rack, and excessive wear on the various components. The problem is accentuated as the components are repeatedly disassembled and reassembled for various cleanings. The fit of the tab between the stem and the handle becomes looser and less accurately alignable with the gradual wear incurred from the repeated disassemblies and reassemblies. It would be advantageous to have a disher with a rigidly affixed tab to which the shaft could be mounted so that alignment problems would not develop over the useful life of the disher while still allowing easy disassembly of the components.

Dishers are preferably color-coded according to bowl size. There are nine standard sizes of bowls used by the industry and each bowl is matched with a single industry standard color. Typically, the handle or a portion of the handle includes this color so that a user may quickly and easily know the bowl size. When the dishers are used for commercial food service, it is important that the proper bowl size is used so that accurate predetermined portions of the product may be served. This ensures the desired level of profitability per helping served.

Problems occur with removable handles during disassembly and reassembly of the dishers for cleaning or servicing since the color-coded handles may be attached to different stems than the ones from which they were removed. In this event, the color-coded handle no longer properly designates the size of the bowl being used Mixing the handles and bowls leads to the service of inaccurate portions of product, and possibly leads to lower profitability. It would be advantageous to have a unitary handle presenting a substantially smooth exterior which could not be removed from the bowl so that a user can be assured that the color-coding on the handle accurately indicates the bowl size. Additionally, it would be advantageous to have a color-coded handle which extended into proximity with the bowl so that even while the disher was being handled by a user, a supervisor could easily determine from a distance, by the exposed color, whether the user serving the product was using the appropriately sized bowl.

An example of a prior art disher is the Crestware 18-8 Stainless Steel Ice Cream Disher manufactured by Crest Manufacturing Inc. This disher has a boss attached to a bowl, a stem attached to the boss of a proximate end, and a handle which is screwed onto the distal end of the stem, thereby pinching a shaft support tab between the stem and handle. A thumb rack support piece is stamped in the tab and helps support the thumb rack as it is moved transversely to the handle to operate the shaft and move the sweep within the bowl. All of these extensions and inter-part attachment loci provide potential areas for product accumulation which, in the case of food, can create unsanitary conditions. In this prior art disher, the joints in proximity to the bowl are coated with a filler material. However, as discussed above, many filler materials, such as epoxy, can chip away, facilitating unsanitary food and soil collection.

Nothing in the prior art suggests the use of a unitary, non-removable handle assembly which eliminates unsanitary product collection regions and prevents improperly matching removable color-coded handles with bowls of predetermined sizes.

SUMMARY OF THE INVENTION

The present invention provides an apparatus for serving predetermined portions of a product. The apparatus comprises a server assembly which, in its preferred embodiment, includes a scoop and a support assembly. The scoop has an exterior surface and an interior surface wherein the interior surface defines a cavity for holding the product. The cavity is generally hemispherical and has a diametral axis. The scoop also includes first and second apertures which extend through the scoop, between the exterior surface and the cavity, and are substantially aligned with the diametral axis.

The apparatus also comprises a support assembly which includes a stem that is affixed to the exterior surface of the scoop. The stem extends from the server assembly generally along a longitudinal axis which is generally parallel with the diametral axis. The support assembly also includes a first tab and a second tab which are both affixed to the stem and extend from the stem towards the diametral axis.

The apparatus further comprises a handle assembly which has a first end and a second end, with the first end being substantially proximate the exterior surface of the scoop. The handle assembly is substantially aligned with the longitudinal axis and substantially intimately envelopes the stem. The handle assembly presents a substantially smooth exterior intermediate the first and second ends.

Still further, the apparatus comprises a product separation assembly which includes a product separator for separating the product from the interior surface of the scoop. The separator moves pivotably within the cavity between the first and second apertures and is configured for sweeping generally adjacent at least a portion of the interior surface of the scoop. The product separation assembly also includes a drive for driving the product separator. The drive is rotatably attached to at least one of the first or second tabs and is substantially coaxial with the diametral axis. The drive is affixed to the product separator and, when rotated about the diametral axis, causes the product separator to sweep generally adjacent the interior surface of the scoop. The product separation assembly also includes an actuator assembly which is pivotally mounted on at least one of the first or second tabs. The actuator assembly traverses a path generally transverse to the plane including the longitudinal axis and diametral axis in response to an actuating force. The actuator assembly and drive are configured to cooperate to translate the transverse motion of the actuator assembly into rotational motion of the drive.

BRIEF DESCRIPTION OF THE DRAWINGS

The invention will hereafter be described with reference to the accompanying drawings, wherein like numerals denote like elements in the various figures, and:

FIG. 2 is a front view of the preferred embodiment of the product serving apparatus of the present invention;

FIG. 3 is a back view of the preferred embodiment of the product serving apparatus of the present invention;

FIG. 4 is a top view of the preferred embodiment of the product serving apparatus of the present invention;

FIG. 5 is a bottom view of the preferred embodiment of the product serving apparatus of the present invention;

FIG. 8 is a sectional view of the preferred embodiment of the product serving apparatus of the present invention taken along section 8—8 of FIG. 4;

FIG. 9 is an enlarged detail view of a portion of the preferred embodiment of the product serving apparatus of the present invention showing the sealing member;

FIG. 10 is a top view of the sealing member; and

FIG. 11 is a sectional view of the sealing member taken generally along line 11—11 of FIG. 10.

DETAILED DESCRIPTION OF A PREFERRED EMBODIMENT

Figure 1:
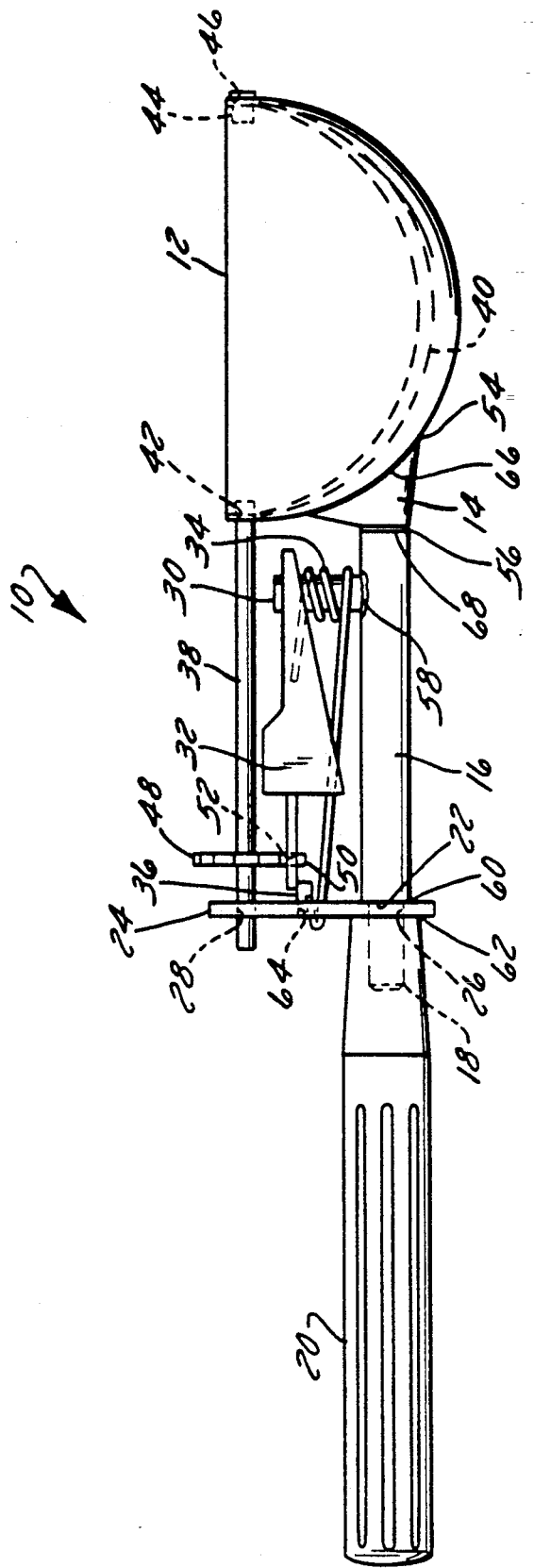
FIG. 1 is a front view of a prior art disher.

FIG. 1 is a front view of a prior art disher. In FIG. 1, a prior art disher 10 is shown to include a bowl 12 which is attached to a boss 14 which, in turn, is attached to a stem 16. Stem 16 includes a threaded end 18 to which a handle 20 is threadably engaged. A tab 24 is captively engaged between handle 20 and a flange 22 of stem 16. Tab 24 typically includes a stem aperture 26 and a bearing aperture 28. Stem aperture 26 receives threaded end 18 therethrough so that tab 24 may be captively engaged between stem flange 22 and handle 20 when handle 20 is screwed onto end 18. Stem aperture 26 may be keyed to stem 16 to inhibit rotation of tab 24 about stem 16.

Stem 16 also includes a mounting pin 30 on which a thumb rack 32 is pivotally mounted. Typically a coil spring 34 is disposed over a mounting pin 30 and engages thumb rack 32 and tab 24 to bias thumb rack 32 in a direction transverse to stem 16. Generally, tab 24 includes a punched-out portion 36 which extends towards bowl 12 and serves as a bearing surface for thumb rack 32 when thumb rack 32 is pivoted on mounting pin 30.

Thumb rack 32 is configured to cooperate with a drive shaft 38 which, in turn, is connected to a sweep 40. Sweep 40 is a thin metal band configured for sweeping motion generally along the interior surface of bowl 12. Typically, drive shaft 38 is rotatably mounted in bearing aperture 28 and a first shaft aperture 42 in bowl 12 so that a portion of shaft 38 extends into the interior of bowl 12. Sweep 40 is attached between the portion of shaft 38 extending into bowl 12 and a sweep bearing 44 which is rotatably mounted in a second shaft aperture 46 in bowl 12. As shaft 38 is rotated, sweep 40 pivots within the interior of bowl 12.

Rotational motion is imparted to shaft 38 by thumb rack 32 which responds to an actuating force, such as pressure from the thumb of an individual using disher 10. A pinion gear 48 affixed to shaft 38 includes a plurality of gear teeth 50 which cooperate with a plurality of slots 52 in thumb rack 32. As thumb rack 32 is pivoted transversely to stem 16, slots 52 engage gear teeth 50, rotating pinion gear 48 and shaft 38 and causing sweep 40 to pivot within the interior of bowl 12.

Prior art disher 10 has problems: its reliability of operation unacceptably deteriorates with age and use because of its complexity of components, and the resulting unsanitary cracks, voids, gaps, and crevices which are left in the regions where various components are joined to one another, making it difficult to adequately clean disher 10 to meet NSF standards. For instance, a joint 54 (i.e., a soil collection point) is located where boss 14 is attached to bowl 12. A second joint 56 is located where stem 16 is attached to boss 14. A third joint 58 is located where mounting pin 30 is attached to stem 16. A fourth joint 60 is located between flange 22 of stem 16 and tab 24. A fifth joint 62 is located between handle 20 and tab 24. Additionally, punched-out portion 36 leaves a hollow recess 64 and leaves sharp corners and angles where the product being served (or other soil) can collect. Each of these joints, connections, sharp corners, and angles establishes a collection area where soil may collect. If the product being served is a food product, the food will collect in these collection areas and will not be washed away when prior art disher 10 is cleaned according to normal cleaning methods. This leads to build-up of bacteria and other microorganisms which create a dangerously unsanitary product serving device.

It would be advantageous to have a handle assembly which did not provide collection areas in which product or other soil could collect in a manner resistant to cleaning.

NSF standards require that crevices in proximity to bowl 12 be filled with an epoxy or filler, thus hopefully reducing the areas in which bacteria and other microorganisms may thrive. For example, in prior art disher 10 as illustrated in FIG. 1, a band of filler material 66 is applied where boss 14 is attached to bowl 12. Similarly, a second band of filler material 68 is applied where stem 16 is joined to boss 14, but no other product accumulation areas are filled. The use of such filler material in various joints may help prevent build-up of product and propagation of bacteria, however, it is desirable to limit the use of such filler to the extent possible. Often, epoxies and fillers will break loose or chip away as disher 10 is used. Once such breaking or chipping occurs, product can collect in the gaps and voids thereby produced, leading to an unsanitary device. It would be advantageous to eliminate the use of such fillers, to the extent possible, as well as to eliminate other collection areas to promote sanitary dispensing of the product being served.

Other problems with prior art disher 10 relate to its multiplicity of components. To conform to NSF standards, shaft 30, sweep 40, thumb rack 32, and coil spring 34 must be removable for cleaning. In prior art disher 10, such disassembly often involves the removal of handle 20 from threaded end 18 and the removal of tab 24 from threaded end 18. Once this is accomplished, shaft 38 and sweep 40 may be removed through shaft aperture 42. Thumb rack 32 and spring 34 can then be removed from mounting pin 30. Following this disassembly the components may be cleaned and then reassembled.

After repeated cleanings involving the disassembly and reassembly of the various components, it becomes difficult to maintain tab 24 and bearing aperture 28 in alignment with shaft aperture 42. Even if tab 24 is keyed to stem 16, the keyed portions become worn and tab 24 may be less precisely aligned than when new. This leads to binding of shaft 38, binding of thumb rack 32, added wear on the various other components, and greater difficulty and less reliability in using prior art disher 10. Additionally, the interior threads of handle 20 which engage threaded end 18 are subject to wear, particularly if the threads are plastic, as they sometimes are. As the threads wear, handle 20 engages stem 16 less securely and, consequently, handle 20 is less able to hold tab 24 rigidly in place. This also contributes to binding, excess wear, and difficulty of use of prior art disher 10.

The removability of handle 20 presents other problems. According to industry standards, product serving devices such as disher 10 are made with bowls of nine different sizes. Each disher size has a specific color-code which indicates its particular respective bowl capacity. The quantity of scoops per quart is the indication of disher size. The standard disher sizes, fluid ounce capacities, and color codes are as follows:

| Disher Size (Scoops per Quart) | Approximate Fluid Ounce Capacity | Color Code |
| --- | --- | --- |
| 6 | 5.33 | White |
| 8 | 4.00 | Gray |
| 10 | 3.20 | Ivory |
| 12 | 2.67 | Green |
| 16 | 2.00 | Dark Blue |
| 20 | 1.60 | Yellow |
| 24 | 1.33 | Red |
| 30 | 1.07 | Black |
| 40 | 0.80 | Orchid |

Generally these color codes are incorporated into the handle so that a user may easily determine the appropriate bowl size simply by looking at the color on the handle. The problem with prior art devices, such as prior art disher 10, is that the handle can be removed and if numerous differently sized dishers are being used, the color-coded handles are easily interchanged and reassembled with bowls of the wrong size for that particular color-code. Additionally, even if handle 20 is properly color-coded to match the size of bowl 12, it is difficult for a supervisor to observe the size of the disher being used from a distance since the handle is substantially covered by the hand of the user. It would be advantageous to have a uniform handle assembly which eliminated many of the unsanitary product accumulation sites while providing the potential for color-coding beyond that portion of the device which is covered by the user's hand.

FIGS. 2, 3, 4 and 5 are front, back, top, and bottom views, respectively, of the preferred embodiment of the present invention. In these Figures, a product serving apparatus 100 is shown as including a server assembly 102 which includes an apportioning scoop 104 for establishing predetermined portions of a product. A support assembly 106 including a tab assembly 108 is attached to scoop 104.

Serving apparatus 100 also includes a handle assembly 110 which is generally aligned with a longitudinal axis 111. Handle assembly 110 has a first end 112 disposed in proximity to scoop 104 and a second end 114. Handle assembly 110 presents a substantially smooth exterior 116 intermediate first end 112 and second end 114. Smooth exterior 116 preferably is free from joints, junctions, or other product or soil collection areas. The term "smooth" as used to describe exterior 116 throughout this application means free from any voids, cracks, fissures, gaps, divots, or other discontinuities which may collect and hold the product being served or other soil.

Product serving apparatus 100 also includes a product separation assembly 118. Product separation assembly 118 includes a product separator 120 (see FIG. 3) affixed to a drive 122 and configured for pivotal movement within scoop 104. Drive 122 is rotatably mounted on support assembly 106 and rotates in response to transverse movement by an actuator assembly 124 that is pivotably mounted on support assembly 106. A bias member 126, preferably a coil spring, is mounted between actuator assembly 124 and support assembly 106 to bias actuator assembly 124 in a direction generally transverse to handle assembly 106.

Apportioning scoop 104 includes an exterior surface 128 and an interior surface 130. Interior surface 130 defines an interior cavity 132 configured for holding the food product. Cavity 132 is preferably generally hemispherical and includes a diametral axis 134 disposed generally parallel with longitudinal axis 111. Apportioning scoop 104 further includes a first aperture 136 and a second aperture 138, each being substantially aligned with diametral axis 134 and extending through apportioning scoop 104 from exterior surface 128 to interior cavity 132. Apertures 136, 138 are configured for pivotably receiving product separator 120 generally in the manner of a thrust bearing.

Product separation assembly 118 includes product separator 120, drive 122, and actuator assembly 124, which all cooperate to separate the food product from interior surface 130 in response to a user exerting an actuating force against actuator assembly 124. As in the prior art, a user typically moves actuator assembly 124 with a thumb or finger in a direction generally transverse to a plane containing diametral axis 134 and longitudinal axis 111. The components of product separation assembly 118 are supported in part on tab assembly 108, which includes a first tab 140 and a second tab 142.

Product separator 120 includes a sweep 144, preferably a thin metal band, which is generally semicircular and configured to move substantially adjacent interior surface 130 to separate food product from interior surface 130. Sweep 144 is connected to a bearing 146 which is rotatably received in first aperture 136. The second end of sweep 144 is affixed to drive 122, which is rotatably received in second aperture 138. Thus, when drive 122 is rotated, product separator 120 is pivoted at least partially along interior surface 130.

Figure 6:
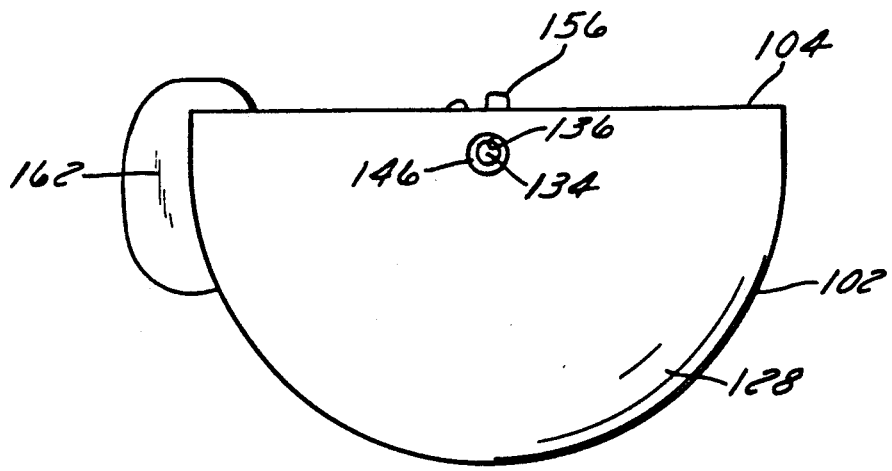
FIG. 6 is an end view of the preferred embodiment of the product serving apparatus of the present invention as viewed from the right end of FIG. 2.
Figure 7:
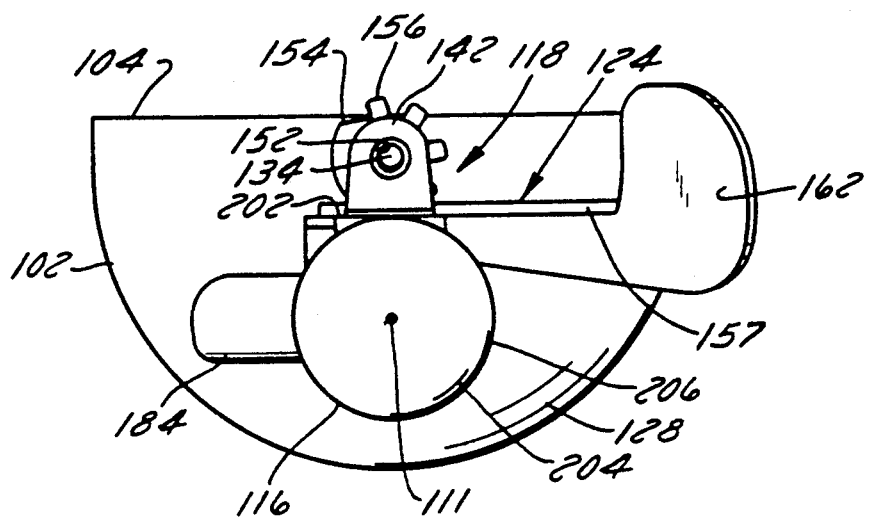
FIG. 7 is a end view of the preferred embodiment of the product serving apparatus of the present invention as viewed from the left end of FIG. 2.

Drive 122 includes a shaft 147 having a first end 148, which is preferably of expanded diameter and rotatably received in second aperture 138. Shaft 147 also includes a second end 150 rotatably received in a tab aperture 152 extending through second tab 142. Drive 122 further includes a pinion gear 154 designed to cooperate with actuator assembly 124. Pinion gear 154 is preferably mounted to drive shaft 147 between tab 142 and apportioning scoop 104. In operation, as actuator assembly 124 is moved, pinion gear 154 and shaft 147 are rotated, pivoting product separator 120 at least partially along interior surface 130 within interior cavity 132. Preferably, both tab aperture 152 and drive 122 are substantially coaxial with diametral axis 134. Pinion gear 154 includes a plurality of gear teeth 156, as best shown in FIGS. 6 and 7.

Actuator assembly 124 is operably connected with at least one of tabs 140, 142. Preferably, actuator assembly 124 is pivotably mounted on tab 140. Actuator assembly 124 includes a generally pie-shaped rack 157 having a broad end 158 and a narrow end 159. Disposed along broad end 158 of pie-shaped rack 157 are a plurality of holes 160 appropriately spaced for interaction with gear teeth 156 to translate transverse pivotal motion of actuator assembly 124 into rotational motion of drive 122. An actuator lever 162 is disposed at one side of pie-shaped rack 157 and extends outwardly beyond broad end 158. Actuator lever 162 is preferably configured to comfortably receive the thumb or finger of a person using serving apparatus 100. As the user directs an actuating force against lever 162 and generally towards handle assembly 110, actuator assembly 124 is pivoted about an actuator axis 164. Preferably, actuator axis 164 is substantially coaxial with first tab 140.

At narrow end 159, rack 157 includes a slot 166 which pivotably engages first tab 140. In the preferred embodiment of the present invention, first tab 140 is generally flat but includes a pair of cut-out notches 168 which cooperate with slot 166 to support rack 157. Since slot 166 is narrower than the overall width of first tab 140 but wide enough to slidingly engage notches 168, rack 157 may pivot about first tab 140 while being retained in notches 168. Second tab 142 is disposed in close proximity to broad end 158 of rack 157, thus preventing slot 166 from disengaging from notches 168.

Bias member 126 is preferably a coil spring having a center coil portion 170 and a pair of extending legs 172. Each leg 172 preferably extends from coil portion 170 substantially along a tangent to coil portion 170. Coil 170 preferably encircles first tab 140 and is disposed between handle assembly 110 and pie-shaped rack 157. Legs 172 are trapped between actuator lever 162 and second tab 142 and bias actuator lever 162 toward a rest position. As actuator lever 162 is moved from its rest position towards handle assembly 110, additional potential energy is stored in bias member 126. When the actuating force is released from actuator lever 162, the stored potential energy in bias member 126 will return actuator lever 162 to its rest position.

Handle assembly 110 and its ends 112 and 114 are preferably substantially aligned with longitudinal axis 111. Handle assembly first end 112 is substantially proximate exterior surface 128 of apportioning scoop 104 and preferably abuts exterior surface 128 in a sealing engagement. However, in an alternate embodiment, a sealing member 182 is captively and compressedly disposed in an annular space 183 between first end 112 and exterior surface 128. Handle assembly 110 further includes an integral finger brace 184 which extends outwardly generally transverse to longitudinal axis 111 at a location generally proximate second tab 142. Handle 110 also has a gripping portion 186 disposed towards second end 114 Optionally, gripping portion 186 includes longitudinal gripping members 188 disposed on the top and bottom sides of gripping portion 186. Gripping members 188 are preferably free from any soil or product collection points to preserve the substantially smooth exterior 116 of handle assembly 110.

FIG. 8 is a sectional view of the product serving apparatus 100 taken generally along section 8—8 of FIG. 4. FIG. 8 illustrates the integral construction of support assembly 106 and handle assembly 110. Support assembly 106 includes a stem 190 for supporting the apportioning scoop 104. Stem 190 is affixed to exterior surface 128 and extends generally along longitudinal axis 111. Stem 190 includes a connection end 192 which is affixed to exterior surface 128, preferably by welding, and a handle support portion 194 from which tab assembly 108 extends. Connection end 192 is generally circular with a generally concave center portion 196 having a concavity generally matching the shape of exterior surface 128. Connection end 192 is designed for use with apportioning scoops of any of the nine standard sizes. If the curvature of a particular apportioning scoop 104 differs slightly from the concavity of concave center portion 196, connection end 192 is coined or otherwise worked to provide substantially intimate contact between exterior surface 128 and concave center portion 196 prior to welding or other affixation. This provides a significantly stronger resistance to torque or other forces since a single large weldment or other affixation can be made at the connection end.

Preferably, connection end 192 also includes an outer lip 198 about its periphery. Lip 198 curves outwardly from exterior surface 128 in a direction opposite the curvature of concave portion 196. This double concavity further increases the strength of connection end 192 and stem 190.

Handle support portion 194 extends from connection end 192 generally along longitudinal axis 111 towards second end 114. In the preferred embodiment, handle support portion 194 has a generally U-shaped cross-section to provide greater rigidity. Tab assembly 108 extends outwardly from handle support portion 194 and is affixed (preferably welded) to handle support portion 194. Tab assembly 108 may be a separate component having a base 200 from which first tab 140 and second tab 142 extend. Base portion 200 is welded or otherwise affixed to handle support portion 194; for example, attachment could be effected by adhesive or trapped against handle support portion 194 by handle assembly 110. Additionally, tabs 140 and 142 could be formed from the material of stem 190 and bent to a position extending outwardly from handle support portion 194.

Stem 190 is substantially intimately enveloped by handle assembly 110 to provide a rigid unitary, or integral structure. Handle assembly 110, preferably comprising a plastic material capable of injection molding, also substantially intimately envelopes at least a portion of first tab 140 and at least a portion of second tab 142. Handle assembly 110 is appropriately formed around second tab 142 to provide a bearing surface 202 for supporting pie-shaped rack 157. Generally between first end 112 and second tab 142, handle assembly 110 has a solid portion 201 where solid material extends from stem 190 to the substantially smooth exterior 116. However, in the general area of gripping portion 186, handle assembly 110 preferably has a hollow region 203 to conserve material and weight. Solid portion 201 and hollow region 203 are integrally connected and substantially aligned with longitudinal axis 111.

An important aspect of this invention is the substantially unitary construction of support assembly 106 and handle assembly 112 which encapsulates stem 190 to present a substantially uninterrupted surface or exterior extending between first end 112 and second end 114 of handle assembly 110. This integral, or unitary construction provides serving apparatus 100 with great rigidity and strength while providing a crevice free exterior 116. There are no joints or other collection areas formed between first end 112 and second end 114 where soil or product may be trapped. In other words, imaginary line segments could be established through handle assembly 110, between first end 112 and second end 114, along its exterior 116 without intersecting any discontinuity. This is very different from the typical prior art handle which includes numerous joints, connection points, and other collection areas.

Hollow gripping portion 186 is sealed by an end cap 204 at second end 114. End cap 204 preferably has a circular outer wall 206 situated generally perpendicular to longitudinal axis 111 and of approximately the same diameter as the outside diameter of handle assembly 110 at second end 114. Extending inward from outer wall 206 is an annular sleeve 208 which is appropriately sized for sliding engagement within hollow region 187. An annular ridge 210 encircles the outside of annular sleeve 208 and is configured for mating engagement with an annular groove 212 located inside gripping portion 186 in communication with hollow region 203. Annular ridge 210 and annular groove 212 preferably snappingly engage to ensure that end cap 204 remains attached at second end 114. Preferably, handle assembly 110 is formed by injection molding under pressure and at a temperature elevated above ambient temperature and end cap 204 is inserted at second end 114 while handle assembly 110 is still warm. Thus, as handle assembly 110 cools, gripping portion 186 contracts annular ridge 210 around annular sleeve 208 to provide a secure fit.

Another important aspect of this invention, is the simplicity of construction which facilitates easy disassembly, cleaning, and reassembly. To meet NSF standards, the product separator, drive, actuator assembly, and biasing member must be amenable to disassembly to facilitate cleaning. In prior art devices, this often involved disassembly of numerous components including portions of the handle or tabs. In contrast, disassembly of the present invention involves only four separable components: integral scoop assembly 214, biasing member 126, actuator assembly 124, and the combined product separator 120 and drive 122. Integral scoop assembly 214 includes server assembly 102, support assembly 106, handle assembly 110, and end cap 204.

Handle assembly 110 is preferably color-coded according to the size of apportioning scoop 104 as established by industry standards discussed above. Although the color-coding could be applied to end cap 204 alone, it is desirable to have the entire handle assembly 110 appropriately colored to facilitate use of the proper sized scoop 104 for a particular job. Managers, who must supervise accurate apportionment of a product, can thus easily see the color of the handle from a distance and know the size of the scoop being used. Also, since handle assembly 110 is affixed to scoop 104, there is no danger of mismatched handles and scoops.

As mentioned above, handle assembly 110 may be formed directly against exterior surface 128 of server assembly 102 or, alternatively, sealing member 182 may be employed between first end 112 and exterior surface 128. Sealing member 182 is preferably a ring of nitrile rubber disposed generally between outer lip 198 of connection end 192 and exterior surface 128. When handle assembly 110 is injection molded, the pressure exerted by the molded material compresses sealing member 182 between end 112 and exterior surface 128 and simultaneously forces sealing member 182 deeper into annular space 183 between outer lip 198 and exterior surface 128.

FIG. 9 is an enlarged detail view of a portion of the product serving apparatus 100 showing sealing member 182. As illustrated, sealing member 182 presents an impermeable barrier to any soil that might otherwise collect in the annular space 183 between end 112 and exterior surface 128. It is important that sealing member 182 be placed under sufficient compression to prevent the entrance of any contaminants. Additionally, sealing member 182 includes a notched portion 216 oriented towards first end 112. Thus, as handle assembly 110 is formed against sealing member 182, handle material is pressed during molding into notched portion 216, securely affixing sealing member 182 to handle assembly 110 in an integral relationship.

FIGS. 10 and 11 are top and cross-sectional views, respectively, of sealing member 182. Sealing member 182 is an annular ring having a top surface 218, a bottom surface 220, an outside surface 222, an inside surface 224, and a center axis 226 generally parallel with inside surface 224. Outside surface 222 tapers inward from bottom surface 220 as it extends towards top surface 218. However, outside surface 222 and top surface 218 do not intersect since they are interrupted by annular notched portion 216. Bottom surface 220 tapers towards top surface 218 progressing from outside surface 222 towards inside surface 224. This tapered structure facilitates sealing engagement between sealing member 182 and outside surface 128 when sealing member 182 is compressed between handle assembly end 112 and server assembly 102.

It will be understood that the foregoing description is of preferred exemplary embodiments of this invention, and that the invention is not limited to the specific forms shown. For example, the support assembly may be attached to the server assembly other than by welding, the handle assembly may be made from a variety of different materials so long as the material is able to provide a substantially smooth impermeable surface, and the sealing member may be made from a variety of materials and in a variety of configurations. These and other modifications may be made in the design and arrangement of the elements without departing from the scope of the invention as expressed in the appended claims.

We claim:

1. An apparatus for serving a predetermined portion of a product, the apparatus comprising:
    a server assembly; said server assembly including:
        an apportioning means for establishing said predetermined portion, said apportioning means having an exterior surface and an interior surface, said interior surface defining a cavity for holding said product, said cavity being generally hemispherical and having a substantially diametral axis; said apportioning means having a first aperture and a second aperture, said first aperture and said second aperture being substantially aligned with said diametral axis and traversing said apportioning means from said exterior surface to said cavity;
    a support assembly; said support assembly including:
        a stem means for supporting said apportioning means, said stem means being affixed to said exterior surface, said stem means extending from said server assembly generally along a longitudinal axis, said longitudinal axis being generally parallel with said diametral axis;
        said support assembly further including a first tab and a second tab, said first tab and said second tab each being affixed to said stem means and extending from said stem means toward said diametral axis;
    a handle assembly having a first end and a second end, said handle assembly being substantially aligned with said longitudinal axis, said first end being substantially proximate said exterior surface, said handle assembly substantially intimately enveloping said stem means and at least a portion of each of said first tab and said second tab and presenting a generally smooth exterior intermediate said first end and said second end; and
    a product separation assembly; said product separation assembly including:
        a product separator means for separating said product from said interior surface, said product separator means being captively disposed intermediate said first and second apertures, said product separator means being configured for sweeping generally adjacent at least a portion of said interior surface to effect said separating;
        a drive means coupled with said product separator means for driving said product separator means, said drive means being rotatably coupled with at least one of said first tab and said second tab, said drive means being substantially coaxial with said diametral axis, said product separator means responding to rotation of said drive means about said diametral axis to effect said sweeping; and
        an actuator means for actuating said drive means, said actuator means being operably connected with at least one of said first tab and said second tab, said actuator means pivoting substantially about an actuator axis in response to an actuating force, said actuator axis being transverse to said longitudinal axis, said actuator means having a first motion translation means and said drive means having a second motion translation means, the first and second motion translation means cooperating to impart said rotation to said drive means in response to said pivoting of said actuator means.

2. The apparatus of claim 1, wherein said handle assembly includes a substantially solid portion integrally connected with a substantially hollow portion, said solid portion and said hollow portion being substantially aligned with said longitudinal axis.

3. The apparatus of claim 1, wherein said scoop is one of a plurality of differently sized scoops for serving the predetermined portions of product.

4. The apparatus of claim 3, wherein said support assembly, said handle assembly, said drive means, and said actuator assembly are used with any one of said plurality of differently sized scoops.

5. The apparatus of claim 4, wherein said handle assembly appears substantially uniformly colored intermediate said first end and said second end.

6. The apparatus of claim 5, wherein said handle assembly is color-coded according to the size of said scoop selected from said plurality of differently sized scoops.

7. The apparatus of claim 1, wherein said handle assembly at least partially intimately envelops said first tab and said second tab.

8. The apparatus of claim 1, wherein said handle assembly includes an integral finger brace extending outward and generally perpendicular to said longitudinal axis.

9. The apparatus of claim 8, wherein said handle assembly includes an integral bearing portion for supporting said actuator assembly.

10. An apparatus for serving a predetermined portion of a product, the apparatus comprising:

a server assembly; said server assembly including:
  a scoop having an exterior surface and an interior surface, said interior surface defining a cavity for holding said product, said cavity being generally hemispherical and having a diametral axis; said scoop having a first aperture and a second aperture, said first aperture and said second aperture being substantially aligned with said diametral axis and traversing said scoop from said exterior surface to said cavity;

a support assembly; said support assembly including:
  a stem affixed to said exterior surface, said stem extending from said server assembly generally along a longitudinal axis, said longitudinal axis being generally parallel with said diametral axis;
  said support assembly further including a first tab and a second tab, said first tab and said second tab each being affixed to said stem and extending from said stem toward said diametral axis;

a handle assembly having a first end and a second end, said handle assembly being substantially aligned with said longitudinal axis, said first end being substantially proximate said exterior surface, said handle assembly providing a substantially impermeable envelope surrounding said stem, said envelope including a substantially smooth exterior between said first end and said second end;

a sealing member captively compressedly disposed intermediate said scoop and said handle assembly, said sealing member substantially precluding deposition of contaminants intermediate said scoop and said handle assembly; and a product separator assembly; said product separator assembly including:
  a product separator means for separating said product from said interior surface, said product separator means being captively disposed intermediate said first and second apertures, said product separator means being configured for sweeping generally adjacent at least a portion of said interior surface to effect said separating;
  a drive means coupled with said product separator means for driving said product separator, said drive means being rotatably coupled with at least one of said first tab and said second tab, said drive means being substantially coaxial with said diametral axis, said product separator means responding to rotation of said drive means about said diametral axis to effect said sweeping; and
  an actuator means for actuating said drive means, said actuator means being operably connected with at least one of said first tab and said second tab, said actuator means pivoting substantially about an actuator axis in response to an actuating force, said actuator axis being transverse to said longitudinal axis, said actuator means having a first motion translation means and said drive means having a second motion translation means, the first and second motion translation means cooperating to impart said rotation to said drive means in response to said pivoting of said actuator means.

11. The apparatus of claim 10, wherein said handle assembly includes a substantially solid portion integrally connected with a substantially hollow portion, said solid portion and said hollow portion being substantially aligned with said longitudinal axis.

12. The apparatus of claim 10, wherein said scoop is one of a plurality of differently sized scoops for serving the predetermined portions of product.

13. The apparatus of claim 12, wherein said support assembly, said handle assembly, said drive means, and said actuator assembly are used with any one of said plurality of differently sized scoops.

14. The apparatus of claim 13, wherein said handle assembly appears substantially uniformly colored intermediate said first end and said second end.

15. The apparatus of claim 14, wherein said handle assembly is color-coded according to the size of said scoop selected from said plurality of differently sized scoops.

16. The apparatus of claim 10, wherein said handle assembly at least partially intimately envelops said first tab and said second tab.

17. The apparatus of claim 10, wherein said handle assembly includes an integral finger brace extending outward and generally perpendicular to said longitudinal axis.

18. The apparatus of claim 17, wherein said handle assembly includes an integral bearing portion for supporting said actuator assembly.

19. The apparatus of claim 10, wherein said flexible sealing member includes an annular tapered surface abutting against said exterior surface.

20. The apparatus of claim 10, wherein said flexible sealing member includes an annular notched portion configured for interlocking engagement with said handle assembly first end.

21. An apparatus for serving predetermined portions of a product, the apparatus comprising:

a server assembly; said server assembly including:
  a scoop having an exterior surface and an interior surface, said interior surface defining a cavity for holding said product, said cavity being generally hemispherical and having a diametral axis; said scoop having a first aperture and a second aperture, said first aperture and said second aperture being substantially aligned with said diametral axis and traversing said scoop from said exterior surface to said cavity;

a support assembly; said support assembly including:
  a stem affixed to said exterior surface, said stem extending from said server assembly generally along a longitudinal axis, said longitudinal axis being generally parallel with said diametral axis;
  said support assembly further including a first tab and a second tab, said first tab and said second tab each being affixed to said stem and extending from said stem toward said diametral axis;

a handle assembly having a first end and a second end, said handle assembly being substantially aligned with said longitudinal axis and said first end being substantially proximate said exterior surface, said handle assembly substantially intimately enveloping said stem and at least partially enveloping said first tab and said second tab, said handle assembly being integrally formed whereby a plurality of connected line segments may be established within said handle assembly intermediate said first end and said second end with no line segment of said plurality of line segments intersecting any discontinuity in said handle assembly; and a product separator assembly; said product separator assembly including:

a product separator means for separating said product from said interior surface, said product separator means being captively disposed intermediate said first and second apertures, said product separator means being configured for sweeping generally adjacent at least a portion of said interior surface to effect said separating;

a drive means coupled with said product separator means for driving said product separator, said drive means being rotatably coupled with at least one of said first tab and said second tab, said drive means being substantially coaxial with said diametral axis, said product separator means responding to rotation of said drive means about said diametral axis to effect said sweeping; and an actuator means for actuating said drive means, said actuator means being operably connected with at least one of said first tab and said second tab, said actuator means pivoting substantially about an actuator axis in response to an actuating force, said actuator axis being transverse to said longitudinal axis, said actuator means having a first motion translation means and said drive means having a second motion translation means, the first and second motion translation means cooperating to impart said rotation to said drive means in response to said pivoting of said actuator means.

22. The apparatus of claim 21, wherein said handle assembly includes a substantially solid portion integrally connected with a substantially hollow portion, said solid portion and said hollow portion being substantially aligned with said longitudinal axis.

23. The apparatus of claim 21, wherein said scoop is one of a plurality of differently sized scoops for serving the predetermined portions of product.

24. The apparatus of claim 23, wherein said support assembly, said handle assembly, said drive means, and said actuator assembly are used with any one of said plurality of differently sized scoops.

25. The apparatus of claim 24, wherein said handle assembly appears substantially uniformly colored intermediate said first end and said second end.

26. The apparatus of claim 25, wherein said handle assembly is color-coded according to the size of said scoop selected from said plurality of differently sized scoops.

27. The apparatus of claim 21, wherein said handle assembly includes an integral finger brace extending outward and generally perpendicular to said longitudinal axis.

28. The apparatus of claim 27, wherein said handle assembly includes an integral bearing portion for supporting said actuator assembly.

29. An apparatus for serving a predetermined portion of a product, the apparatus comprising:

a server assembly; said server assembly including:

an apportioning means for establishing said predetermined portion, said apportioning means having an exterior surface and an interior surface, said interior surface defining a cavity for holding said product, said cavity being generally hemispherical and having a substantially diametral axis; said apportioning means having a first aperture and a second aperture, said first aperture and said second aperture being substantially aligned with said diametral axis and traversing said apportioning means from said exterior surface to said cavity;

a support assembly; said support assembly including:

a stem means for supporting said apportioning means, said stem means being affixed to said exterior surface, said stem means extending from said server assembly generally along a longitudinal axis, said longitudinal axis being generally parallel with said diametral axis;

said support assembly further including a first tab and a second tab, said first tab and said second tab each being affixed to said stem means and extending from said stem means toward said diametral axis;

a handle assembly having a first end and a second end, said handle assembly being substantially parallel with said longitudinal axis, said first end being substantially proximate said exterior surface, said handle assembly being integrally formed over said stem to contain said stem and present a crevice-free exterior extending intermediate said first end and said second end; and a product separation assembly; said product separation assembly including:

a product separator means for separating said product from said interior surface, said product separator means being captively disposed intermediate said first and second apertures, said product separator means being configured for sweeping generally adjacent at least a portion of said interior surface to effect said separating;

a drive means coupled with said product separator means for driving said product separator means; said drive means being rotatably coupled with at least one of said first tab and said second tab; said drive means being substantially coaxial with said diametral axis, said product separator means responding to rotation of said drive means about said diametral axis to effect said sweeping; and an actuator means for actuating said drive means, said actuator means being operably connected with at least one of said first tab and said second tab, said actuator means pivoting substantially about an actuator axis in response to an actuating force, said actuator axis being transverse to said longitudinal axis, said actuator means having a first motion translation means and said drive means having a second motion translation means, the first and second motion translation means cooperating to impart said rotation to said drive means in response to said pivoting of said actuator means.

30. An apparatus for serving a predetermined portion of a product, the apparatus comprising:

a server assembly; said server assembly including:

an apportioning means for establishing said predetermined portion, said apportioning means having an exterior surface and an interior surface, said interior surface defining a cavity for holding said product, said cavity being generally hemispherical and having a substantially diametral axis; said apportioning means having a first aperture and a second aperture, said first aperture and said second aperture being substantially aligned with said diametral axis and traversing said apportioning means from said exterior surface to said cavity;

a support assembly; said support assembly including:
a stem means for supporting said apportioning means, said stem means being affixed to said exterior surface, said stem means extending from said server assembly generally along a longitudinal axis, said longitudinal axis being generally parallel with said diametral axis;
said support assembly further including a first tab and a second tab, said first tab and said second tab each being affixed to said stem means and extending from said stem means toward said diametral axis;

a handle assembly having a first end and a second end, said handle assembly being substantially parallel with said longitudinal axis, said first end being substantially proximate said exterior surface, said handle assembly and said support assembly cooperating to form a substantially unitary construction, wherein said handle assembly is made from a material encapsulating said stem to cover said stem and present a substantially uninterrupted surface extending between said first end and said second end; and a product separation assembly; said product separation assembly including:
a product separator means for separating said product from said interior surface, said product separator means being captively disposed intermediate said first and second apertures, said product separator means being configured for sweeping generally adjacent at least a portion of said interior surface to effect said separating;
a drive means coupled with said product separator means for driving said product separator means; said drive means being rotatably coupled with at least one of said first tab and said second tab; said drive means being substantially coaxial with said diametral axis, said product separator means responding to rotation of said drive means about said diametral axis to effect said sweeping; and
an actuator means for actuating said drive means, said actuator means being operably connected with at least one of said first tab and said second tab, said actuator means pivoting substantially about an actuator axis in response to an actuating force, said actuator axis being transverse to said longitudinal axis, said actuator means having a first motion translation means and said drive means having a second motion translation means, the first and second motion translation means cooperating to impart said rotation to said drive means in response to said pivoting of said actuator means.

31. An apparatus for serving a predetermined portion of a product, the apparatus comprising:
a server assembly; said server assembly including:
an apportioning means for establishing said predetermined portion, said apportioning means having an exterior surface and an interior surface,
said interior surface defining a cavity for holding said product, said cavity being generally hemispherical and having a substantially diametral axis; said apportioning means having a first aperture and a second aperture, said first aperture and said second aperture being substantially aligned with said diametral axis and traversing said apportioning means from said exterior surface to said cavity;

a support assembly; said support assembly including:
a stem means for supporting said apportioning means, said stem means being affixed to said exterior surface, said stem means extending from said server assembly generally along a longitudinal axis, said longitudinal axis being generally parallel with said diametral axis;
said support assembly further including a first tab and a second tab, said first tab and said second tab each being affixed to said stem means and extending from said stem means toward said diametral axis;

a handle assembly having a first end and a second end, said handle assembly being substantially aligned with said longitudinal axis, said first end being substantially proximate said exterior surface and forming a crevice between said first end and said exterior surface, said handle assembly substantially intimately enveloping said stem means and at least a portion of each of said first tab and said second tab and presenting a generally smooth exterior intermediate said first end and said second end;

a sealing member captively compressedly disposed in said crevice, said sealing member substantially precluding deposition of contaminants intermediate said scoop and said handle assembly; and a product separation assembly; said product separation assembly including:
a product separator means for separating said product from said interior surface, said product separator means being captively disposed intermediate said first and second apertures, said product separator means being configured for sweeping generally adjacent at least a portion of said interior surface to effect said separating;
a drive means coupled with said product separator means for driving said product separator means, said drive means being rotatably coupled with at least one of said first tab and said second tab, said drive means being substantially coaxial with said diametral axis, said product separator means responding to rotation of said drive means about said diametral axis to effect said sweeping; and
an actuator means for actuating said drive means, said actuator means being operably connected with at least one of said first tab and said second tab, said actuator means pivoting substantially about an actuator axis in response to an actuating force, said actuator axis being transverse to said longitudinal axis, said actuator means having a first motion translation means and said drive means having a second motion translation means, the first and second motion translation means cooperating to impart said rotation to said drive means in response to said pivoting of said actuator means.

32. An apparatus for serving a predetermined portion of a product, the apparatus comprising:

a scoop having an exterior surface and an interior surface, said interior surface defining a cavity for holding said product;

a support assembly, said support assembly including;

a stem affixed to said exterior surface, said stem extending from said scoop generally along a longitudinal axis, said longitudinal axis being generally parallel with a diametral axis of said scoop;

said support assembly further including a first tab and a second tab, said first tab and said second tab each being affixed to said stem and extending from said stem towards said diametral axis;

a handle assembly having a first end and a second end, said handle assembly being substantially aligned with said longitudinal axis, said first end being substantially proximate said exterior surface, said handle assembly substantially intimately enveloping said stem and presenting a generally smooth exterior intermediate said first end and said second end; and a product separation assembly, said product separation assembly including:

a product separator connector with said scoop and configured to sweep within said cavity to separate said product within said scoop; and an actuator mechanism pivotably mounted on at least one of said first tab and said second tab, said actuator mechanism being connected with said product separator by a drive member, said drive member moving said product separator within said cavity when said actuator mechanism is pivoted.

33. The apparatus of claim 32, wherein said handle assembly includes a substantially solid first portion integrally connected with a substantially hollow second portion, said first portion and said second portion being substantially aligned with said longitudinal axis.

34. The apparatus of claim 32, wherein said handle assembly at least partially intimately envelops said first tab and said second tab.

35. The apparatus of claim 34, wherein said handle assembly includes an integral bearing portion for supporting said actuator assembly.

36. The apparatus of claim 32, further comprising a sealing member captively compressedly disposed intermediate said scoop and said handle assembly, said sealing member substantially precluding deposition of contaminants intermediate said scoop and said handle assembly.

* * * * *